United States Patent Office 3,530,156
Patented Sept. 22, 1970

3,530,156
METHOD FOR THE PRODUCTION OF α-SUBSTITUTED ACIDS
Ljudmila Sergeevna Bondar, Jugo-Zapad, kvartal 42-a, korp. 15, kv. 20, and Rostan Alexandrovich Okunev, Nova-Basmannaya ul. 4/6, kv. 162, both of Moscow, U.S.S.R.
No Drawing. Filed Oct. 3, 1968, Ser. No. 764,912
Int. Cl. C11c 1/06
U.S. Cl. 260—413   8 Claims

ABSTRACT OF THE DISCLOSURE

A method for the production of α-substituted acids which comprises reacting an alkyl or cycloalkyl malonic ester with α,β-unsaturated aliphatic alcohols, such as terpene alcohols, at a temperature above the boiling point of the alcohol and saponifying the resultant ester. The products are useful as detergents, wetting agents, flotation agents and foaming agents.

This invention relates to methods for the production of acids and, more particularly, to methods of producing α-substituted unsaturated acids which are useful as detergents, wetting agents, flotation agents, foaming agents, solvents and plasticizers for rubbers and plastics, emulsion or suspension stabilizers, special-purpose detergents, disinfectants, preservatives, and also as pharmaceutical preparations. It is known, for example, to employ 5,9-dimethyl-2-cyclohexyl-4,8-decadienoic acid (cygerolum) in medicine for treating wounds and ulcers, which do not readily heal as well as other skin lesions.

It is known to prepare α-substituted unsaturated acids by the alkylation of malonic ester, followed by the saponification of the obtained disubstituted malonic ester and subjecting the disubstituted malonic ester to decarboxylation. The alkylation is a two-stage process, wherein the first stage is carried out in an alcoholic medium, e.g. in ethyl alcohol, in the presence of sodium alkoxide, and involves reacting the formed enol derivative of malonic ester with an alkyl-(cycloalkyl) halide to yield the corresponding alkyl-(cycloalkyl) malonic ester. The second stage comprises contacting the alkyl-(cycloalkyl) malonic ester prepared in the first stage with finely divided metallic sodium in a hydrocarbon solvent to obtain the enol derivative which is next reacted with an unsaturated aliphatic halide to yield the corresponding disubstituted malonic ester. The resultant ester is thereafter saponified to yield the corresponding disubstituted malonic acid which is subjected to decarboxylation.

The known method suffers from the disadvantage of being a multistage process and of involving the use of metallic sodium, making it mandatory to take precautions against fire and explosion hazards. Moreover, the saponification of the aforesaid disubstituted malonic esters requires a significant excess of concentrated alcoholic solution of alkali, while the decarboxylation step is accompanied by vigorous foaming due to the high viscosity of disubstituted malonic esters which may throw the reaction mixture out of the reaction vessel.

An object of the present invention is to provide a novel method capable of simplifying the production of target compounds.

This object has been accomplished by a method which comprises, reacting a substituted malonic ester with an α,β-unsaturated aliphatic alcohol at a temperature above the boiling point of the alcohol, followed by saponification of the resultant ester. Alkyl or cycloalkyl-substituted malonic esters are used as the aforesaid monosubstituted malonic esters, while any terpene alcohol, such as linalool or nerolidol, may be used as the α,β-unsaturated aliphatic alcohol.

Apart from the aforesaid alkyl- or cycloalkyl-substituted malonic esters, use can also be made of substituted malonic esters containing heteroatoms in the alkyl-or cycloalkyl substituent.

The present method has been employed for the synthesis of the heretofore unknown α-hexyl- and α-cyclohexyl-5,9,13-trimethyl - 4,8,12 - tetradecatrienoic acids which may find commercial applications analogous to those indicated hereinabove for α-substituted unsaturated acids.

The method of the invention has been accomplished in the following manner. The reactants, viz., an alkyl or cycloalkyl substituted malonic ester and a terpene alcohol taken in equimolar amounts (or the substituted malonic ester is taken in excess) are charged into a reaction vessel and heated to a temperature above the boiling point of the alcohol. The reaction mass is then subjected to fractionation or the volatile components are stripped off, followed by saponifying the ester fractions corresponding to the target product or the residue after stripping off the volatile components.

The process is assumed to be complete when the rate of carbon dioxide evolution from the reaction mixture diminishes sharply.

The present method is advantageous in that it can be effected in a single stage, involves a minimum of auxiliary process steps, calls for the employment of a limited range of starting materials, and presents practically no fire or explosion hazards. As compared to the known method, the consumption rate of analogous reactions will be comparable or essentially lower when recourse is had to the present method.

For a better understanding of the present invention, the following examples are given by way of illustration.

Example 1.—Synthesis of α-butyl-5,9-dimethyl-4,8-decadienoic acid

A mixture of 108.2 g. of butylmalonic ester and 77.1 g. of linalool (B.P. 196° C.) is placed in a reaction vessel connected to a condenser, a receiver and a gasometer flask (measuring cylinder) and maintained at a temperature of 210–230° C. for a period of 1.0–1.5 hours. Upon termination of the reaction, as evidenced by a sharp drop of the rate of carbon dioxide evolution (from 40–45 ml./min. down to 7–10 ml./min.), the reaction mixture is fractionated in vacuum to separate ethyl α-butyl-5,9-dimethyl-4,8-decadienoate. The ester is then saponified with an alcoholic solution of potassium hydroxide and fractionated in vacuum to yield 50 g. of α-butyl-5,9-dimethyl-4,8-decadienoic acid (40% of the theoretical amount).

Example 2.—Synthesis of α-hexyl-5,9-dimethyl-4,8-decadienoic acid

A mixture of 488.6 g. of hexylmalonic ester and 154.2 g. of linalool is charged into a reaction vessel and maintained at a temperature of 210–235° C. for 2.5–3.0 hours. The termination of the reaction manifests itself in a sharp drop of the rate of carbon dioxide evolution (from 35–75 ml./min. down to 10–20 ml./min.). The reaction mixture is then subjected to fractional distillation to separate the starting materials and by-products from the target product, viz, ethyl α-hexyl-5,9-dimethyl-4,8-decadieonate. The ester is saponified with an excess of a 3 N alcoholic solution of potassium hydroxide. Fractionation in vacuum yields 149 g. of α-hexyl-5,9-dimethyl-4,8-decadienoic acid (53.2% of the theoretical amount based on the linalool charge).

Example 3.—Synthesis of α-isohexyl-5,9-dimethyl-4,8-decadienoic acid

A mixture of 122.2 g. of isohexylmalonic ester and 77.1 g. of linalool is placed in a reaction vessel and maintained at a temperature of 215–240° C. for 1.5–2.0 hours. The termination of the reaction manifests itself in a sharp drop in the rate of carbon dioxide evolution (from 40–60 ml./min. down to 10–15 ml./min.). The reaction mixture is then subjected to fractional distillation to separate ethyl α-isohexyl-5,9 - dimethyl - 4,8 - decadienoate, which is saponified with an excess a 3 N alcoholic potassium hydroxide solution. Vacuum fractionation yields 73 g. of α-isohexyl-5,9-dimethyl-4,8-decadienoic acid (52% of the theoretical amount).

Example 4.—Synthesis of α-cyclohexyl-5,9-dimethyl-4,8-decadienoic acid

A mixture of 484.6 g. of cyclohexylmalonic ester and 154.2 g. of linalool is charged into a reaction vessel and maintained at a temperature of 225–245° C. for a period of 2–3 hours. The end of the reaction is noted as disclosed in Example 1. The reaction mixture is then subjected to fractionation in vacuum to remove volatile components, e.g. the starting compounds and by-products. The still residue containing ethyl α-cyclohexyl-5,9-dimethyl-4,8-decadienoate is saponified with an excess of 3 N alcoholic potassium hydroxide. Fractionation in vacuum yields 110 g. of α-cyclohexyl-5,9-dimethyl-4,8-decadienoic acid (40% of the theoretical amount based on the linalool charge).

Example 5.—Synthesis of α-undecyl-5,9-dimethyl-4,8-decadienoic acid

Into a reaction vessel are charged 76.8 g. of undecylmalonic ester and 38.5 g. of linalool and the reaction mixture is maintained at a temperature of 210–250° C. for a period of 1.5–2.0 hours. The end of the reaction is noted as disclosed is Example 1. Then the reaction mixture is fractionated to separate ethyl α-undecyl-5,9-dimethyl-4,8-decadienoate, which is subjected to saponification with twice the theoretical amount of 4 N alcoholic potassium hydroxide and thereafter fractionated in vacuum. The yield of α-undecyl-5,9-dimethyl-4,8-decadienoic acid is 52 g. (60% of the theoretical amount).

Example 6.—Synthesis of α-hexyl-5,9,13-trimethyl-4,8,12-tetradecatrienoic acid Into a reaction vessel are charged 48.9 g. of hexylmalonic ester and 22.2 g. of nerolidol, and the contents of the reaction vessel are heated at 260–320° C. for 1–3 hours. The end of the reaction is noted as disclosed in Example 1. The reaction mixture is fractionated in vacuum to remove the unconverted starting compounds and by-products, followed by subjecting the still residue containing ethyl α-hexyl-5,9,13-trimethyl-4,8,12-tetradecatrienoate to saponification with 4 N alcoholic potassium hydroxide. Fractionation of the saponified product yields 14 g. of α-hexyl-5,9,13-trimethyl-4,8,12-tetradecatrienoic acid (40% of the theoretical amount based on the nerolidol charge); B.P. 237–247° C./7 mm. Hg; $n_D^{20}$ 1.4870; $d_4^{20}$ 0.9220. MR found. 108.73; calcd., 108.55.

*Analysis.*—Found (percent): C, 79.89; H, 11.58. Calcd. for $C_{23}H_{40}O_2$ (percent): C, 79.25; H, 11.57.

Example 7.—Synthesis of α-cyclohexyl-5,9,13-trimethyl-4,8,12-tetradecatrienoic acid Into a reaction vessel are charged 25.5 g. of cyclohexylmalonic ester and 11.1 g. of nerolidol and the contents of the reaction vessel are heated at 270–330° C. for 1–3 hours. The end of the reaction is noted as disclosed in Example 1. The reaction mixture is distilled in vaccum at a temperature of up to 170–190° C./10 mm. of mercury to remove the unconverted starting compounds and by products, while the still residue is vacuum fractionated to separate ethyl α-cyclohexyl-5,9,13-trimethyl-4,8,12-tetradecatrienoate.

The thus separated ester is saponified with a 4N alcoholic solution of potassium hydroxide; fractional distillation of the saponification product yields 6.6 g. of α-cyclohexyl-5,9,13-trimethyl-4,8,12-tetradecatrienoic acid (35% of the theoretical amount based on the nerolidol charge); B.P. 205–208° C./2 mm. Hg; $n_D^{20}$ 1.4896; $d_4^{20}$ 0.9438; MR found 106.09, calcd. 106.36.

*Analysis.*—Found (percent): C, 79.94; H, 11.18: Calcd. for $C_{23}H_{38}O_2$ (percent): C, 79.71; H, 11.05. Yield 35% of theory based on the nerolidol charged.

We claim:

1. A method for the production of α-substituted unsaturated acids which comprises reacting an alkyl or cycloalkyl malonic ester with a terpene alcohol at a temperature above the boiling point of the alcohol and saponifying the resultant ester.

2. A method according to claim 1, wherein an alkylmalonic ester is reacted.

3. A method according to claim 1, wherein a cycloalkyl malonic ester is reacted.

4. A method according to claim 1, wherein the terpene alcohol is linalool or nerolidol.

5. α-hexyl - 5,9,13 - trimethyl-4,8,12-tetradecatrienoic acid.

6. α-cyclohexyl-5,9,13-trimethyl-4,8,12-tetradecatrienoic acid.

7. A method according to claim 2 wherein the alkyl malonic ester is butyl, hexyl, isohexyl or undecyl malonic ester.

8. A method according to claim 3 wherein the cycloalkyl malonic ester is cyclohexyl malonic ester.

References Cited

Allen et al., Journ. Chem. Soc., 1962, pp. 4468–4475.

LEWIS GOTTS, Primary Examiner

E. G. LOVE, Assistant Examiner

U.S. Cl. X.R.

260—514, 533